United States Patent [19]

Wilson

[11] 4,288,201
[45] Sep. 8, 1981

[54] VANE COOLING STRUCTURE

[75] Inventor: Gregory S. Wilson, Jupiter, Fla.

[73] Assignee: United Technologies Corporation, Hartford, Conn.

[21] Appl. No.: 75,397

[22] Filed: Sep. 14, 1979

[51] Int. Cl.³ .............................................. F01D 9/02
[52] U.S. Cl. .................................. 415/115; 415/136; 415/178; 415/191
[58] Field of Search ............... 415/115, 178, 116, 185, 415/191, 196, 134, 135, 136, 137, 138, 139; 416/96

[56] References Cited

U.S. PATENT DOCUMENTS

| | | | |
|---|---|---|---|
| 2,847,185 | 8/1958 | Petrie et al. | 415/115 |
| 3,301,527 | 1/1967 | Kercher | 415/115 |
| 3,471,126 | 10/1969 | Abild | 415/134 |
| 3,540,810 | 11/1970 | Kercher | 415/115 |
| 3,767,322 | 10/1973 | Durgin et al. | 416/96 |
| 3,768,921 | 10/1973 | Brown et al. | 416/96 |

FOREIGN PATENT DOCUMENTS 938247 10/1963 United Kingdom ................ 415/115

Primary Examiner—Robert E. Garrett
Attorney, Agent, or Firm—Robert C. Walker

[57] ABSTRACT

The present invention provides improved concepts for making judicious use of vane cooling air without introducing mechanical stresses or differential growth induced deformation into the structure. Maintenance of an adequate pressure differential across a tubular insert without inhibiting thermal growth is sought and a specific object is to closely control the leakage of cooling air between a slidable end of the insert and the interior of the vane.

In one effective embodiment incorporating concepts of the present invention, a tubular insert 26 is affixed to the vane at one end 32 thereof and is free to slide along the interior surface 28 of the vane at the other end 34 thereof. Leakage of cooling air between the insert and the vane is controlled by closely toleranced correspondence of a closure plate 36 at the slidable end of the insert with a cooling air supply tube 38 which penetrates the closure tube.

5 Claims, 2 Drawing Figures

VANE COOLING STRUCTURE

The Government has rights in this invention pursuant to Contract No. F33657-76-C0216 awarded by the Department of the Air Force.

DESCRIPTION

1. Technical Field

This invention relates to stator vanes of rotary machinery, and more particularly to vane disposed across the flowpath of high temperature working medium gases in such machinery.

The concepts were developed in the gas turbine engine industry for use in turbine vanes of gas turbine engines, but have wider applicability to similarly configured structures of other machines employing high temperature working medium fluids.

2. Background Art

The most significant background art related to the concepts of the present invention is disclosed within the gas turbine engine field. In such field high pressure cooling air is flowed to the interior of the vanes of one or more stator stages to protect the vanes from the adverse effects of high temperature working medium gases. Varied cooling concepts are employed, including the combined impingement and conective cooling cocepts disclosed in the representative U.S. Pat. Nos. 3,540,810 to Kercher entitled "Slanted Partition for Hollow Airfoil Vane Insert", and 3,767,322 to Durgin et al entitled "Internal Cooling for Turbine Vanes". In each of the above patents high pressure cooling air is supplied to the interior of the turbine vane and is distributed about the interior surface of the vane by a tube or insert internally of the vane structure. In each of the structures the tube or insert is spaced apart from the interior of the airfoil wall such that cooling air is flowable between the tube or insert and the wall. Cooling as a result of high velocity discharge against the wall is known within the industry as "impingement" cooling. Cooling as a result of flow along the space between the tube or insert and the wall is known within the industry as "convective" cooling. In order to insure effective cooling it is essential that a pressure differential be maintained at all points across the tube or insert. Maintaining a very substantial pressure differential in impingement cooled structures is particularly required in order that the cooling air be adequately accelerated across the insert to impinging velocities.

The avoidance of cooling air flow around, rather than into the space between the insert and the airfoil wall is a prime consideration in all structures. Initial component tolerances must be closely controlled and the effects of differential thermal growth and distortion between the insert and the vane must be mitigated. In the Durgin et al structure the radially outer portion of the insert is secured directly to the radially outward portion of the vane to prevent leakage therebetween. Similarly, in the Kercher structure the insert is secured as a one-piece structure to the vane such that all of the cooling fluid is forced into the hollow interior of the insert. Both structures are rigid forms which may induce high mechanical stresses and/or severe thermal distortion in the inserts.

Although these structures of the prior art may prevent the leakage of cooling fluid between the tube or insert and the airfoil wall, less rigid structures having reduced susceptibility to stress and thermal distortion are sought by scientists and engineers in the industry.

DISCLOSURE OF THE INVENTION

According to the present invention the insert of the coolable vane is rigidly secured to one end of the vane and is slidable about a cooling air supply tube of closely toleranced dimension at the other end thereof to enable the control of leakage between the insert and the vane at the slidable end without inducing significant mechanical stresses or deformation in the insert.

A primary feature of the present invention is the insert for distributing cooling air about the interior of the vane. The insert is fixedly attached at one end and is slidable at the opposing end with respect to the interior wall of the vane. The slidable end has a closure plate which is penetrated by a tube of circular cross section for admitting cooling air to the interior of the insert.

A principal feature of the present invention is the ability of the structure to supply adequate, yet judicious amounts of cooling fluid to the interior of the insert without inducing mechanical stresses in the insert. The potential leakage of substantial cooling fluid between the insert and the interior walls of the vane is eliminated by providing a closely toleranced fit between the end plate of the insert and the cooling air supply tube. Stresses and deformation of the insert as a result of differential thermal expansion are avoided by providing a loose fit between the insert and the interior walls of the vanes.

The foregoing, and other features and advantages of the present invention, will become more apparent in the light of the following description and accompanying drawing.

DETAILED DESCRIPTION

Figure 1:
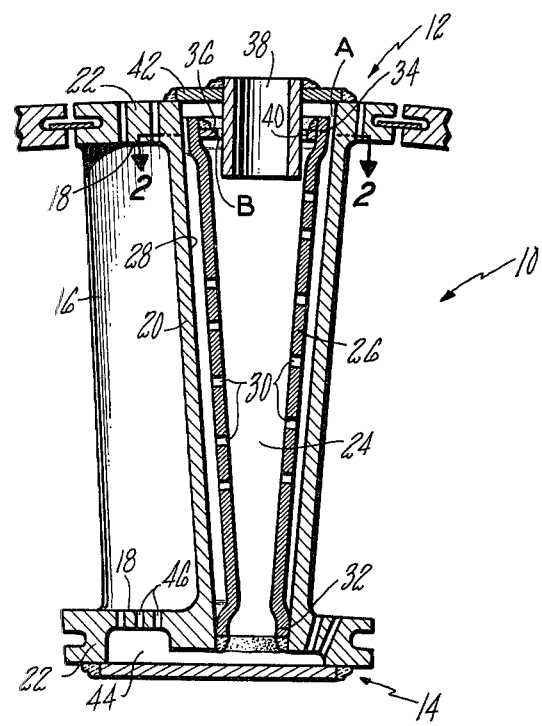
FIG. 1 is a simplified cross section view of a stator vane constructed in accordance with the concepts of the present invention.

The apparatus of the present invention is known to have high utility in the gas turbine engine field and is described with respect to gas turbine engine embodiments thereof. As is shown in FIG. 1 a stator vane of the type employed in a gas turbine engine includes an airfoil section 10, an outer platform section 12, and an inner platform section 14. In modern engines working medium gases at temperatures in excess of twenty-five hundred degrees Fahrenheit (2500° F.) may be flowable over the exterior surface 16 of the airfoil section and over the end surfaces 18 of the platform sections. In such environments the wall 20 of the airfoil section and the walls 22 of the platform sections are cooled to prevent deterioration of the material from which they are formed.

Each vane has a hollow interior cavity 24 into which air is flowable for cooling of the airfoil section wall 20. A tubular insert 26 is closely spaced from the interior or inner surface 28 of the wall 20 and has a multiplicity of holes 30 therein for the distribution of cooling air against the interior surface. The tubular insert is affixed at one end thereof, such as by welding or brazing at the inner platform end 32. The opposite end 34 of the tubular insert is free to slide along the interior surface 28 of the airfoil section wall and is preferably provided with a loose fit thereat to enable stress-free sliding of the insert with respect to the wall. An adequate amount of clearance between the insert and the surface 28 is provided, and may be liberally allotted without regard to cooling air leakage as was the case in former structures. The end 34 of the insert has a closure plate 36 through which a cooling air supply tube 38 extends. Both the tube 38 and the aperture 40 in the closure plate through which the tube extends are circular in geometry. A loose fit is provided between the closure plate and the cooling supply tube. The cooling air supply tube is securely fastened, such as by welding or brazing, to a second end plate 42 which is in turn fastened by welding or brazing to the outer platform of the vane. Resultantly, no cooling air can leak into the space between the insert and the interior wall of the airfoil other than through the clearance at the cooling supply tube 36.

In the embodiment of the vane structure illustrated, the inner platform section 14 has a hollow cavity 44 in communication with the cavity 24 of the airfoil section. A multiplicity of cooling holes 46 penetrate the wall 22 from the cavity 44 to enable cooling of the wall.

Figure 2:
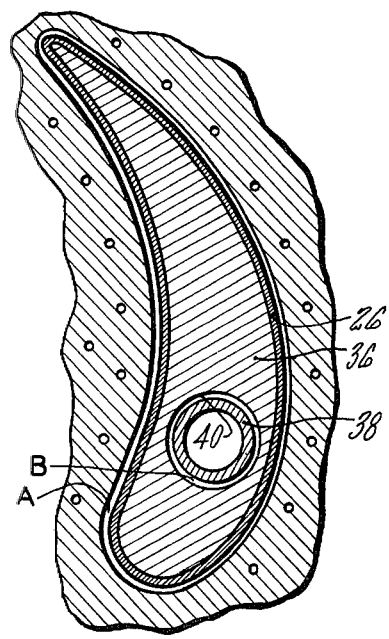
FIG. 2 is a sectional view taken along the line 2—2 as shown in FIG. 1 which illustrates the reduction in potential leakage area which is attainable by employing the supply tube concepts of the present invention.

During operation of the rotary machine in which the vane is employed, working medium gases are flowed over the exterior surfaces of the airfoil. Cooling air is flowable through the tube to the cavity at the interior of the insert. Portions of the cooling air are flowable through each of the holes 30 to cool the proximate airfoil section wall. A substantial pressure differential across the insert is required in order to insure adequate cooling flow and, in impingement cooled embodiments, to enable adequate acceleration of the cooling air to impingement velocities. An adequate pressure differential across the insert is maintained by preventing exessive and unpredicted leakage of cooling air around the end 34 of the insert between the insert and the inner surface 28 of the wall 20. The precise amount of leakage therebetween is limited, not by the uncovered cross sectional area A between the insert and the wall, but rather by the uncovered cross sectional area B between the cooling supply tube 38 and the closure plate 36 as is shown in FIG. 2. Accordingly, the clearance between the insert and the wall 20 is made adequate for alleviation of sliding interference without fear of excessive leakage. The insert remains substantially free of mechanical stresses and deformation.

Although the invention has been shown and described with respect to detailed embodiments thereof it should be understood by those skilled in the art that various changes and omissions in form and detail may be made therein without departing from the spirit and the scope of the invention.

I claim:

1. A coolable stator vane structure of the type disposed across the path of high temperature working medium gases in a rotary machine, the vane structure including:
   an airfoil section having a hollow cavity extending thereacross including an interior surface defining said cavity;
   a tubular insert disposed in said cavity which is fixedly attached at one end to the interior surface and is slidable at the opposing end with respect to the interior surface of the vane;
   a closure plate affixed to the slidable end of the insert and having an aperture therein;
   a tube extending through the aperture of the closure plate through which cooling air is flowable to the hollow cavity of the airfoil section.

2. The vane structure according to claim 1 wherein said fixedly attached end of the insert is welded to the interior surface of the airfoil section.

3. The vane structure according to claim 1 wherein said fixedly attached end of the insert is brazed to the interior surface of the airfoil section.

4. The vane structure according to claim 1 wherein said tube is of circular cross section geometry and wherein said aperture of the closure plate is of corresponding geometry such that close dimensional correspondence of the aperture to the tube is enabled for minimizing the leakage of cooling air therebetween.

5. The vane structure according to claim 1, 2, 3, or 4 which further includes a coolable inner platform section having a cavity therein and wherein said cavity of the airfoil section and said cavity of the inner platform section are communicatively joined to enable the flow of cooling air from the tube to the cavity of the platform section.

* * * * *

UNITED STATES PATENT AND TRADEMARK OFFICE
CERTIFICATE OF CORRECTION

PATENT NO. : 4,288,201
DATED : September 8, 1981
INVENTOR(S) : Gregory S. Wilson It is certified that error appears in the above-identified patent and that said Letters Patent are hereby corrected as shown below:

Col. 1, line 27 "conective" should be -- convective --

Signed and Sealed this

Seventeenth Day of November 1981

[SEAL]

Attest:

GERALD J. MOSSINGHOFF

*Attesting Officer*  *Commissioner of Patents and Trademarks*